United States Patent [19]

Alexander et al.

[11] Patent Number: 5,001,799
[45] Date of Patent: Mar. 26, 1991

[54] SEAL CARRIED BY A VERTICALLY STORING DOCK LEVELER

[75] Inventors: James C. Alexander, London, Canada; Vincent Sullivan, Columbia, Md.

[73] Assignee: Serco Corporation, Ontario, Canada

[21] Appl. No.: 331,983

[22] Filed: Apr. 3, 1989

[51] Int. Cl.⁵ .............................................. E01D 1/00
[52] U.S. Cl. ...................................... 14/71.1; 14/71.5
[58] Field of Search ...................... 14/69.5, 71.1, 71.7; 52/173 DS; 49/475, 485

[56] References Cited

U.S. PATENT DOCUMENTS

| | | | |
|---|---|---|---|
| 1,888,299 | 11/1932 | Tremblay et al. | 49/475 |
| 3,137,017 | 6/1964 | Pfleger et al. | 14/71.3 |
| 3,714,745 | 2/1973 | O'Neal | 52/173 DS |
| 4,178,717 | 12/1979 | Sakauye | 49/475 |
| 4,209,869 | 7/1980 | Trine et al. | 14/69.5 |
| 4,293,969 | 10/1981 | Frommelt | 14/71.1 |
| 4,422,199 | 12/1983 | Frommelt | 14/71.1 |
| 4,557,008 | 12/1985 | Jurden | 14/71.7 |
| 4,679,364 | 7/1987 | Fettig et al. | 52/173 DS |
| 4,682,382 | 7/1987 | Bennet | 52/173 DS |
| 4,776,052 | 10/1988 | Delgado et al. | 14/71.7 |

*Primary Examiner*—Ramon S. Britts
*Assistant Examiner*—Gay Ann Spahn
*Attorney, Agent, or Firm*—Sughrue, Mion, Zinn, Macpeak & Seas

[57] ABSTRACT

A seal for a vertically storing dock leveler employs a foam pad connected to the underside of the deck. As the leveller is lowered, the pad contacts the shelf on to which the leveller is mounted and deflects inward and compresses to seal the space between the underside of the leveller and the shelf. The pad is a tapered foam with a fabric covering.

20 Claims, 2 Drawing Sheets

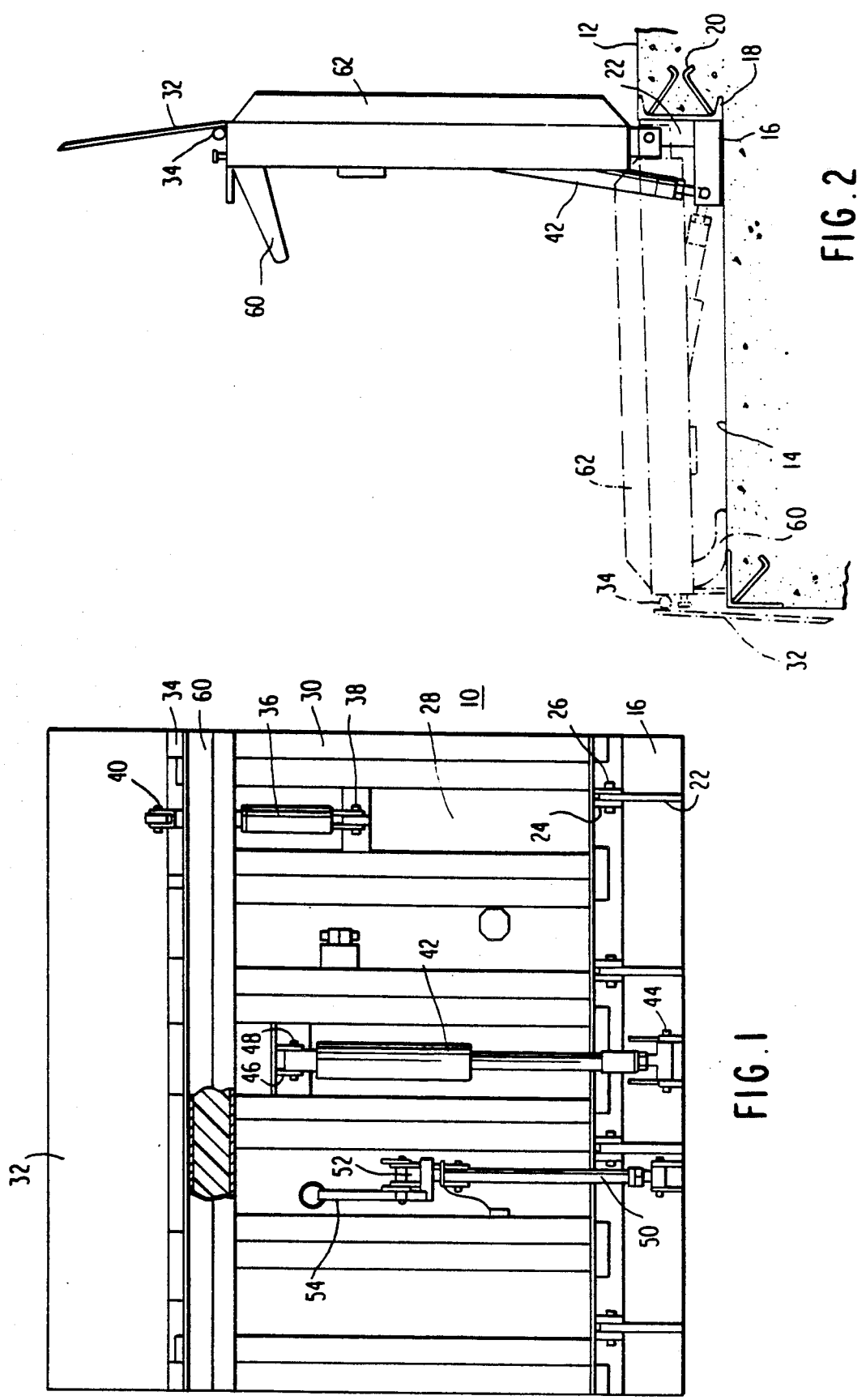

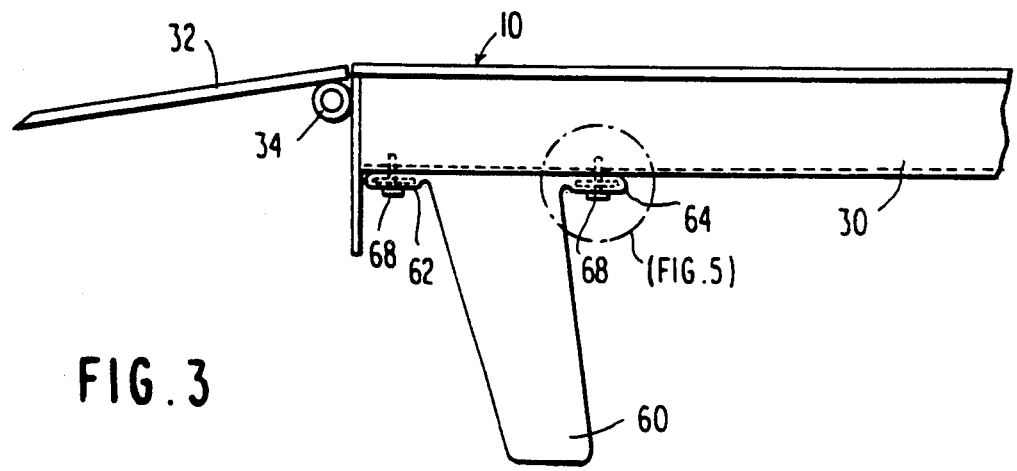
FIG. 3
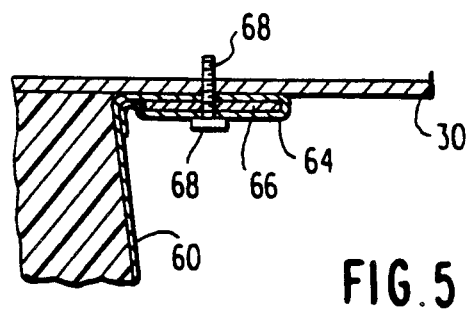
FIG. 5
FIG. 4
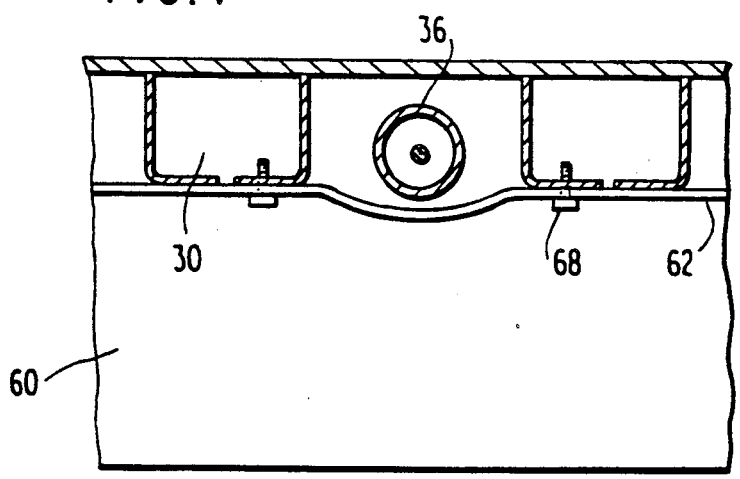

SEAL CARRIED BY A VERTICALLY STORING DOCK LEVELER

BACKGROUND OF THE INVENTION

This invention relates to dock levelers and in particular, to levelers which store vertically. Such devices are used at loading docks to bridge the distance between a truck to be loaded, or unloaded, and the interior of a warehouse, storage facility, or the like. In general these devices accommodate for both the distance between the end of the truck and the dock facility, and the vertical truck "float" as it is loaded and unloaded. That is, the truck will move vertically depending on its state of loading.

For this purpose, dock levelers utilize a lip which extends onto the truck deck and is movable in response to truck float. Generally, such levelers fall into two categories, those which store horizontally with the lip in a downward or pendent position and those which store vertically with the lip generally upward. In both cases, when not in use a roll-down door or the like is used to seal the opening. When the truck backs into the dock for purposes of loading or unloading, the door is opened and the space is generally sealed by means of fixed or adjustable dock seals comprising foam, fabric, inflatable cells or the like which are mounted on the sides of the dock and at the header or top. Such seals are well known and are in common use. In the case of horizontally stored dock levelers, since they are generally mounted into a pit or recess there is no open area underneath the leveler which requires a weather seal.

In contrast, in the case of vertically storing levelers there is a propensity for heat loss or entry into a building since the leveler is generally on a shelf rather than in a pit. In the past, to seal this area it has been conventional to use a pad mounted to the bottom of the face of the building under the dock leveler. However, because the dock leveler lip must be lowered to service a truck which is fully loaded, such a bottom pad is usually complex and has a pocket which in turn becomes a trap for debris. Additionally, such a structure is vulnerable to impact damage by trucks.

SUMMARY OF THE INVENTION

Given this deficiency in the prior art, it is an object of this invention to provide an improved vertically storing dock leveler which carries its own seal.

Yet another object of this invention is a seal for a vertically storing dock leveler which deflects inward and compresses to seal the area from the underside of a lowered dock leveler to the shelf.

Yet another advantage of this invention is to provide for an improved seal usable with a vertically storing dock leveler which has an extended range of deflection to accommodate for various truck heights as the truck is loaded and unloaded yet still provide a weather seal for the underside of the leveler.

These and other objects of this invention are accomplished by means of a vertically storing dock leveler which employs a deck seal fixed to the underside of the leveler deck. The seal is constructed of a resilient foam having a fabric cover. The seal is a wedged shaped pad which deflects through bending rather than pure compression. By deflecting, compensation for varying heights of the deck assembly is achieved. By this invention, a unitary seal across the front of the leveler is provided.

This invention will be described in greater detail by referring to the attached drawing and the description of the preferred embodiment that follows.

BRIEF DESCRIPTION OF THE DRAWING

FIG. 1 is a front elevation of the vertically stored dock leveler in accordance with this invention;

FIG. 2 is an end sectional view of the dock leveler of FIG. 1 illustrating the leveler in the vertical stored position, and in the horizontal position with the lip in a lower pendant position such that the board is at its lowest most point of travel, FIG. 3 is an enlarged partial end view illustrating the details of attachment, FIG. 4 is an enlarged partial front view illustrating deflection over the hydraulic cylinder, and FIG. 5 is an enlarged view showing further details of attachment of the seal.

DESCRIPTION OF PREFERRED EMBODIMENT

As illustrated in the drawings, this invention relates to a vertically stored dock leveler 10. The leveler is mounted onto a loading dock 12 which itself has a pit which is located at an elevation below that of the dock surface 12. While not illustrated, the leveler is mounted in a doorway of a building, the doorway generally being closed by an overhead door, also not shown. Surrounding that doorway, conventionally foam seals are used to provide a technique by which the outer walls of a truck contact the resilient material and a deformate to seal the opening as the truck is loaded or unloaded.

The dockboard or leveler 10 comprises, generally, a support structure or a frame 16 which extends outwardly from a channel 18 which is embedded in the rear wall of the pit by means of anchors 20 or the like. Mounting members or lugs 22 form a part of the frame to which the dockboard is hinged via lugs 24 and a hinge pin 26. As illustrated in FIG. 1, four such points of attachment are illustrated.

The leveler further comprises a deck surface 28 supported by a series of parallel beams 30. Those beams may take any conventional form such as I-channel, C-channel, or the like. In the case of fixed hinges, as illustrated herein, it is preferable that the beams 30 be a split box beam to reduce torsional loading on the dock leveler, yet maintain and provide the necessary strength.

The leveler also includes a lip 32 which is pivotally connected to the deck by means of a hinge 34. The lip 32 is movable independently of the position of the deck by means of hydraulic cylinder 36. The hydraulic cylinder 36 has one end attached to the lower portion of the deck by means of pivot pin 38 with its piston rod hinged to the lip 32 by means of pin 40.

Movement of the deck itself is achieved by means of hydraulic cylinder 42. The cylinder has its lower end pivotally connected to a series of lugs by means of pivot pin 44. The upper end thereof is pivotally connected to the deck by means of lugs 46 and pivot pin 48. It will be appreciated by those knowledgeable in this technology that while a hydraulic cylinder is used for actuation of both the lip 32 and the deck 28, other types of actuation may be employed.

The leveler also includes a toggle lock assembly having a pair of links 50 and 52. That lock assembly is actuated by means of a pull chain and arm 54. Such an assembly may be that which is disclosed in co-pending and commonly assigned U.S. patent application Ser. No. 284,641 filed Dec. 15, 1988, and commonly assigned with this application. Alternatively an assembly such as that found in U.S. Pat. No. 4,776,052 may be used.

In accordance with this invention a bottom pad 60 is employed which comprises a resilient foam having a fabric cover. The bottom pad is secured to the underside of the deck allowing only an opening for actuation by the hydraulic cylinder 36 for lip actuation.

FIG. 2 illustrates the dock leveler in two positions. In the vertical stored position the lip 32 is disposed generally upward. As can be seen, the foam is a wedge shape which protrudes slightly backward from the forward most portion of the dock leveler.

As the dock leveler is lowered, the distal end of the pad 60 contacts the pit surface 14. Continued downward motion of the leveler, as illustrated in FIG. 2, causes rearward deflection of the foam pad. Given the size of the pad, sealing occurs at first contact with the pit 14 and continues as the leveler moves further downward to accommodate a truck as it is being loaded. It will be appreciated that as the truck is unloaded and the leveler raises while the deflection of the pad will reduce, sealing will still occur.

Thus, in accordance with this invention the mode of sealing is primarily one of deflection rather than compression. The use of a conventional foam pad system would require a significant amount of compression at the lowest position and that force of compression would not allow the deck to fall to its lowest most point. By allowing the pad to deflect, a great arrange of dock leveler operation is achieved, with the foam pad deflecting under less force.

An important advantage of this system is that when the leveler is in its vertical raised position as illustrated in FIG. 2. The pit area is clean and unobstructed allowing debris to be removed. Additionally, as further illustrated in FIG. 2 since the pad is located on the underside of the leveler, no part of the truck can come in contact with it. Thus, damage from truck movement, a forklift truck operation, or the like is affirmatively prevented.

FIG. 2 also illustrates side rails 62. Those rails are necessary given the pit mounting of the vertically stored leveler to prevent forklifts and the like from inadvertently falling off the side of the unit.

Referring now to FIGS. 3, 4, and 5, the details of attaching the pad 60 to the underside of the leveler are depicted. In accordance with this invention, the fabric cover of the seal is sewn into a tube or sleeve on each side of the seal. These are illustrated as elements 62, 64. A strip of metal 66 (see FIG. 5) is inserted into each sleeve and the seal is attached to the deck by means of screws 68. Those screws are generally inserted through the strips into the deck beams 30. By this technique, the strip provides clearance over which the hydraulic cylinder 36 or any other component may protrude beyond the beams. Consequently, using this technique a continuous seal may be formed thus, affectively not having any gaps between the underside of the deck and the housing.

It will be appreciated that various modifications of this invention can be practiced without departing from the essential scope thereof.

What is claimed is:

1. A vertically storing dock leveler comprising:
a deck assembly, means at one end of said deck assembly to hingedly mount said deck assembly to a fixed surface, means to move said deck assembly from an upright stored position to a horizontal operative position; a lip pivotally mounted to an opposite end of said deck assembly, means to move said lip and, a seal mounted on said deck assembly and carried thereby to close a space between said deck assembly and a floor when said deck assembly is in operative position and to separate from said floor when said deck assembly is in said upright stored position.

2. The vertically storing dock leveler of claim 1 wherein said seal extends over substantially the width of said deck assembly.

3. The vertically storing dock leveler of claim 1 wherein said seal comprises a resilient foam covered with fabric.

4. The vertically storing dock leveler of claim 1 wherein said seal comprises a wedge shaped resilient pad, said pad deflecting upon contact with said floor to close said space as the deck assembly is lowered.

5. The vertically storing dock leveler of claim 1 wherein said seal is mounted on the underside of the deck assembly at the opposite end.

6. The vertically storing dock leveler of claim 1 wherein said means to move said lip comprises an actuating cylinder mounted to deck assembly and an extensible cylinder rod mounted to said lip and wherein said seal has a gap to permit movement of cylinder rod.

7. The vertically storing leveler of claim 1 wherein said seal comprises a wedge shaped resilient pad covered with fabric, said seal deflecting and compressing upon contact with said floor to close said space as the deck assembly is lowered.

8. The vertically storing leveler of claim 1 further comprising side rails on the deck assembly to prevent a vehicle from running off the side of the leveler.

9. The vertically storing dock leveler of claim 1 wherein said seal comprises a tapered resilient pad, said pad angled inward with respect to the deck assembly whereby the pad deflects inward upon contact with said floor to close the space as said deck assembly is lowered.

10. The vertically storing dock leveler of claim 1 further comprising means to lock to deck assembly into said stored position.

11. A vertically storing dock leveler comprising:
a hingedly mounted deck assembly having at one end a movable lip; means to move said deck assembly and said lip, said deck assembly mounted to a fixed surface including a generally horizontal floor, said deck assembly stored in a substantially vertical position and lowered into a substantially horizontal operative position, and a seal mounted on and carried by said deck assembly to close a space between said deck assembly and said floor when said deck assembly is in the operative position and to separate from said floor when said deck assembly is in said upright stored position.

12. The vertically storing dock leveler of claim 11 wherein said seal extends over substantially the width of said deck assembly.

13. The vertically storing dock leveler of claim 11 wherein said seal comprises a resilient foam covered with fabric.

14. The vertically storing dock leveler of claim 11 wherein seal comprises a wedge shaped resilient pad, said pad deflecting upon contact with floor to close said space as said deck assembly is lowered.

15. The vertically storing dock leveler of claim 11 wherein said seal is mounted on the underside of said deck assembly at the opposite end.

16. The vertically storing dock leveler of claim 11 wherein said means to move said lip comprises an actuating cylinder mounted to deck assembly and an extensible cylinder rod mounted to said lip and wherein said seal has a gap to permit movement of said cylinder rod.

17. The vertically storing leveler of claim 11 wherein said seal comprises a wedge shaped resilient pad covered with fabric, said seal deflecting and compressing upon contact with floor to close said space as the deck assembly is lowered.

18. The vertically storing leveler of claim 11 further comprising side rails on the deck assembly to prevent a vehicle from running off the side of said leveler.

19. The vertically storing dock leveler of claim 11 wherein said seal comprises a tapered resilient pad, said pad angled inward with respect to the deck assembly whereby said pad deflects inward upon contact with floor to close said space as the deck assembly is lowered.

20. The vertically storing dock leveler of claim 11 further comprising means to lock to the deck assembly in a stored position.

* * * * *